(12) United States Patent
Grandjean et al.

(10) Patent No.: US 10,246,367 B2
(45) Date of Patent: Apr. 2, 2019

(54) METHOD FOR PRODUCING A SOLID NANOCOMPOSITE MATERIAL BASED ON HEXA- AND OCTA-CYANOMETALLATES OF ALKALI METALS

(71) Applicant: COMMISSARIAT À L'ÉNERGIE ATOMIQUE ET AUX ÉNERGIES ALTERNATIVES, Paris (FR)

(72) Inventors: Agnès Grandjean, Saint-Marcel-de-Careiret (FR); Yves Barre, Uchaux (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/509,929

(22) PCT Filed: Sep. 11, 2015

(86) PCT No.: PCT/EP2015/070884
§ 371 (c)(1),
(2) Date: Mar. 9, 2017

(87) PCT Pub. No.: WO2016/038206
PCT Pub. Date: Mar. 17, 2016

(65) Prior Publication Data
US 2017/0260083 A1    Sep. 14, 2017

(30) Foreign Application Priority Data

Sep. 12, 2014 (FR) .................... 14 58594

(51) Int. Cl.
*G21F 9/16* (2006.01)
*B05D 1/38* (2006.01)
(Continued)

(52) U.S. Cl.
CPC ............ *C03C 3/06* (2013.01); *B01D 67/0079* (2013.01); *B01J 39/17* (2017.01); *B22F 1/0018* (2013.01);
(Continued)

(58) Field of Classification Search
CPC ... C03C 3/06; C03C 3/078; G21F 9/12; G21F 9/16; B05D 1/38; B05D 3/00; B05D 3/10;
(Continued)

(56) References Cited

U.S. PATENT DOCUMENTS

2012/0125856 A1*   5/2012  Grandjean ............ C03C 11/005
                                                    210/682
2013/0023713 A1    1/2013  Labe et al.
(Continued)

FOREIGN PATENT DOCUMENTS

WO    2010133689 A2    11/2010
WO    2014049048 A1     4/2014
WO    2016038206 A1     3/2016

OTHER PUBLICATIONS

Folch, B., et al., "Synthesis and behaviour of size controlled cyano-bridged coordination polymer nanoparticles within hybrid mesoporous silica", "New Journal of Chemistry", Nov. 12, 2007, pp. 273-282, vol. 32.

*Primary Examiner* — Bijan Ahvazi
(74) *Attorney, Agent, or Firm* — Pearne & Gordon LLP

(57) ABSTRACT

The invention relates to a method for producing a solid nanocomposite material comprising nanoparticles of a metal coordination polymer with ligands CN, said nanoparticles satisfying the formula $[Alk^+_x]M^{n+}[M'(CN)_m]^{z-}$ where Alk is an alkali metal, x is 1 or 2, M is a transition metal, n is 2 or 3, M' is a transition metal, m is 6 or 8, and z is 3 or 4; said $M^{n+}$ cations of the coordination polymer being bound by an organometallic bond or a coordination bond to an organic (Continued)

group R2 of an organic graft, and said organic graft furthermore being chemically attached, preferably by a covalent bond, to at least one surface of a solid support, by reaction of a group R1 of said graft with said surface.

23 Claims, 3 Drawing Sheets

(51) Int. Cl.

| | | |
|---|---|---|
| *B05D 3/00* | (2006.01) | |
| *B05D 3/10* | (2006.01) | |
| *C09K 3/00* | (2006.01) | |
| *C02F 1/28* | (2006.01) | |
| *C02F 1/42* | (2006.01) | |
| *C02F 1/44* | (2006.01) | |
| *B01D 67/00* | (2006.01) | |
| *B01D 69/10* | (2006.01) | |
| *B01D 71/02* | (2006.01) | |
| *C03C 3/06* | (2006.01) | |
| *G21F 9/12* | (2006.01) | |
| *G21F 9/30* | (2006.01) | |
| *B01J 39/17* | (2017.01) | |
| *B22F 1/00* | (2006.01) | |
| *B82Y 30/00* | (2011.01) | |
| *B82Y 40/00* | (2011.01) | |
| *C03C 3/078* | (2006.01) | |

(52) U.S. Cl.
CPC ............ *B22F 1/0081* (2013.01); *B82Y 30/00* (2013.01); *B82Y 40/00* (2013.01); *C03C 3/078* (2013.01); *G21F 9/12* (2013.01); *G21F 9/30* (2013.01); *G21F 9/302* (2013.01); *G21F 9/305* (2013.01)

(58) Field of Classification Search
CPC .. B01D 67/0093; B01D 69/10; B01D 71/024; C02F 1/28; C02F 1/42; C02F 1/444; C09K 3/00; B22F 1/0018; B22F 1/0081; B82Y 30/00; B82Y 40/00
USPC .......... 210/489, 650, 682; 216/39, 681, 688; 252/184; 427/244, 380; 977/773, 903
See application file for complete search history.

(56) References Cited

U.S. PATENT DOCUMENTS

| | | | |
|---|---|---|---|
| 2015/0235721 A1* | 8/2015 | Grandjean | ............... G21F 9/12 210/650 |
| 2015/0307393 A1 | 10/2015 | Guillot et al. | |
| 2016/0016150 A1 | 1/2016 | El Mourabit et al. | |
| 2016/0289796 A1 | 10/2016 | Grandjean et al. | |
| 2016/0318012 A1 | 11/2016 | Causse et al. | |

* cited by examiner

METHOD FOR PRODUCING A SOLID NANOCOMPOSITE MATERIAL BASED ON HEXA- AND OCTA-CYANOMETALLATES OF ALKALI METALS

CROSS-REFERENCE TO RELATED APPLICATIONS

This application is a U.S. national phase under the provisions of 35 U.S.C. § 371 of International Patent Application No. PCT/EP15/70884 filed Sep. 11, 2015, which in turn claims priority of French Patent Application No. 1458594 filed Sep. 12, 2014. The disclosures of such international patent application and French priority patent application are hereby incorporated herein by reference in their respective entireties, for all purposes.

TECHNICAL FIELD

The invention relates to a solid nanocomposite material based on hexa- and octa-cyanometallates of alkali metals.

More specifically, the invention relates to a solid nanocomposite material comprising nanoparticles of a metal coordination polymer with CN ligands comprising metal cations, alkali cations, and hexa- and octa-cyanometallate anions, notably hexa- and octa-cyanoferrate anions, said nanoparticles being bound through an organometallic bond to an organic graft chemically attached inside the pores of a solid support, notably an inorganic solid support.

In other words, the invention relates to a method for functionalizing a solid support with nanoparticles of Prussian blue analogs.

The material prepared by the method according to the invention may notably be used for fixing (binding) mineral pollutants contained in a liquid such as a solution.

In particular, the material prepared by the method according to the invention may be used for fixing (binding) metal cations, notably radioactive cations contained in a liquid.

For example, the material prepared by the method according to the invention may be used for selective adsorption of radioactive Cesium contained in a liquid.

The technical field of the invention may generally be defined as that of mineral fixers.

STATE OF THE PRIOR ART

Nuclear facilities such as power reactors, plants for reprocessing used nuclear fuel, laboratories, research centers and stations for processing liquid effluents, generate radioactive effluents.

These effluents, for which the volumes are considerable, have to be processed and decontaminated before being discarded into the environment.

The pollutants which these effluents contain and which therefore have to be removed, are mainly solid particles and radio-elements essentially present as metal cations in solution.

The extraction, the selective binding of the radio-elements present in these effluents such as solutions is presently generally achieved with organic ion exchange resins.

Such resins have at least two drawbacks. Their capacity is limited on the one hand and because of the irradiating nature of the extracted radio-elements, the latter may in certain cases cause deterioration of the resins under storage conditions on the other hand.

This is notably why for finding a remedy to the defects of organic ion exchange resins were developed mineral fixatives and then composite fixatives, in particular based on analogues of Prussian blue. In this respect, reference may be made to the state of the prior art discussed in document WO-A2-2010/133689 [1].

Document WO-A1-2010/133689 [1] describes a nanocomposite solid material comprising nanoparticles of a metal coordination polymer with CN ligands comprising cations $M^{n+}$, wherein M is a transition metal, and n is 2 or 3; and anions $[M'(CN)_m]^{x-}$, wherein M' is a transition metal, x is 3 or 4, and m is 6 or 8; said cations $M^{n+}$ of the coordination polymer being bound through an organometal bond to an organic group of an organic graft chemically attached inside the pores of a porous glass support.

Document WO-A1-2010/133689 [1] also relates to a method for preparing such a nanocomposite solid material, wherein the following successive steps are carried out:

a) a porous glass support is prepared;

b) chemical attachment of the organic graft is achieved inside the pores of the porous glass support;

c) the porous glass support is put into contact inside the pores from which is attached the organic graft with a solution containing the ion $M^{n+}$, and then the thereby obtained support is washed once or several times and dried;

d) the porous glass support obtained at the end of step c) is put into contact with a solution of a complex of $[M'(CN)_m]^{x-}$, and then the thereby obtained support is washed one or several times and dried; e) the porous glass support obtained at the end of step d) is washed once or several times, and then it is dried;

f) steps c) to e) are optionally repeated.

In other words, this document describes a solid material containing nanoparticles of a Prussian blue analog and its preparation method.

The nanocomposite solid material of this document and its preparation method have many drawbacks.

The support of the nanocomposite solid material of this document is limited to a porous glass support, more exactly a highly specific porous glass support prepared by selective chemical etching of the borate phase of a bulky sodium borosilicate glass, the composition of which is located in the de-mixing area of the phase diagram $SiO_2$—$Na_2O$—$B_2O_3$.

The preparation method described in this document only allows the preparation of a specific material including a highly specific support, and can by no means be transposed to the preparation of materials comprising other supports. The preparation method of this document is therefore not universal.

Further, in this document, because of the method used for the preparation of the material, the hexacyanometallate nanoparticles, for example, hexacyanoferrate nanoparticles bound to the support do not contain any alkaline ions within their structure.

However, it was shown, and this is well known to the man skilled in the art that the hexacyanoferrates containing an alkaline metal in their structure not only have better extraction capabilities, for example of Cs, but also there then was no desalting (release) of the transition metal which enters the structure of the hexacyanoferrate.

Indeed in the case of hexacyanoferrates containing an alkaline metal, the adsorption of the Cs is accomplished by ion exchange with the alkaline metal, such as potassium, while in the case of the use of hexacyanoferrates without any alkaline metal, the adsorption of the Cs is partly accomplished by ion exchange with the transition metal present in the structure of the hexacyanoferrate which leads therefore to desalting of the transition metal.

For discharge standards questions, it is far more preferable to have desalting of potassium rather than desalting of a transition metal such as Co or Ni.

Finally, the synthesis method described in document WO-A1-2010/133689 [1] is relatively complex, and generally requires the use of organic solvents, such as methanol and of a controlled atmosphere.

This synthesis method can therefore be hardly applied at an industrial scale.

Document WO-A1-2014/049048 [2] describes a supported membrane comprising an inorganic solid porous filtration membrane supported by an inorganic solid porous support, said supported membrane comprising nanoparticles of a metal coordination polymer with CN ligands comprising cations $M^{n+}$, wherein M is a transition metal, and n is 2 or 3; and anions $Alk^+_y[M'(CN)_m]^{x-}$, wherein Alk is an alkaline metal, y is 0, 1, or 2, M' is a transition metal, x is 3 or 4, and m is 6 or 8; said cations $M^{n+}$ of the coordination polymer being bound through an organometal bond or a coordination bond to an organic group of an organic graft chemically bound to the surface of the filtration membrane, inside the pores of the filtration membrane, and optionally inside the pores of the support.

Document WO-A1-2014/049048 [2] also describes a method for preparing said supported membrane wherein the following successive steps are carried out:

a) a supported membrane is provided, comprising an inorganic solid porous filtration membrane supported on an inorganic solid porous support;

b) chemical binding of the organic graft to the surface of the filtration membrane is carried out inside the pores of the filtration membrane and optionally inside the pores of the support;

c) the inorganic solid porous filtration membrane is put into contact at the surface of which and inside the pores of which is attached the organic graft and the inorganic solid porous support inside the pores of which is optionally attached the inorganic graft with a solution containing the ion $M^{n+}$, and then the thereby obtained supported membrane is washed once or several times;

d) the supported membrane obtained at the end of step c) is put into contact with a solution of a complex of $[M'(CN)_m]^{x-}$;

e) the supported membrane obtained at the end of step d) is washed once or several times;

f) steps c) to e) are optionally repeated.

The complex of $[M'(CN)_m]^{x-}$ fits the following formula: $(Cat)_x[M'(CN)_m]$ wherein Cat is a cation selected from cations of alkaline metals such as K or Na, of ammoniums, quaternary ammoniums such as tetrabutylammonium ("TBA"), and phosphoniums such as tetraphenylphosphonium ("PPh$_4$").

Although this document claims nanoparticles comprising anions $Alk^+_y[M'(CN)_m]^{x-}$, wherein Alk is an alkaline metal and y is 0, 1, or 2; it was found that the preparation method of this document wherein, during step d) the obtained supported membrane at the end of step c) is put into contact with a solution only containing a complex of $[M'(CN)_m]^{x-}$ such as $(Cat)_x[M'(CN)_m]$, for example $K_4Fe(CN)_6$, was not reproducible and did not give the possibility of obtaining a non-stoichiometric compound for example fitting the formula $K_{2x}Cu_{1-x}[CuFe(CN)_6]$ with x strictly less than 1. In this case, there is a metal, for example Cu in the cage of the structure of the ferrocyanide, and the latter participates in the exchange with Cs during the step for extraction of Cs. Then there is also desalting of Cu in the solution. This desalting is all the greater since x is small, this is the case when the synthesis method described in document WO-A1-2014/049048 [2] is used. This is confirmed by all the examples from the literature.

Further, this method is again not universal, since it exclusively allows specific preparation of a supported membrane comprising an inorganic solid porous filtration membrane supported by an inorganic solid porous support.

Therefore there exist, considering the foregoing, a need for a method for preparing a nanocomposite solid material comprising nanoparticles of a metal coordination polymer with CN ligands, said nanoparticles fitting the formula $[Alk^+_x]M^{n+}[M'(CN)_m]^{z-}$ wherein Alk is an alkaline metal, x is 1 or 2, M is a transition metal, n is 2 or 3, M' is a transition metal, m is 6 or 8, z is 3 or 4; said cations $M^{n+}$ of the coordination polymer being bound through an organometal or coordination bond to an organic group of an organic graft, said organic graft being chemically bound through at least one organic group to at least one surface of a solid support.

The formula given above may be written in a simplified way: $[Alk_x]M[M'(CN)_m]$ wherein M is in the degree of oxidation 2 or 3 and Alk is in the degree of oxidation 1.

This method should further be able to be applied with all kinds of supports regardless of their composition or their shape, and should not be limited to porous glass supports like in the method of document WO-A1-2010/133689 [1].

This method should finally be simple, reliable, reproducible, and preferably have reduced environmental imprint, for example by avoiding the use of organic solvents and of controlled atmospheres.

The goal of the invention is to provide such a method which meets inter alia this need and these requirements.

The goal of the present invention is further to provide such a method which does not have the drawbacks, defects, limitations and disadvantages of the methods of the prior art, such as the methods of documents WO-A1-2010/133689 [1] and WO-A1-2014/049048 [2], and which solves the problems of these documents.

DISCUSSION OF THE INVENTION

This goal, and further other ones are achieved, according to the invention by a method for producing a solid nanocomposite material comprising nanoparticles of a metal coordination polymer with CN ligands, said nanoparticles satisfying the formula $[Alk^+_x]M^{n+}[M'(CN)_m]^{z-}$ wherein Alk is an alkali metal, x is 1 or 2, M is a transition metal, n is 2 or 3, M' is a transition metal, m is 6 or 8, z is 3 or 4; said cations $M^{n+}$ of the coordination polymer being bound through an organometallic or coordination bond to an organic group R2 of an organic graft, and said organic graft being further chemically attached (bound), preferably through a covalent bond, to at least one surface of a solid support by reaction of a group R1 of said graft with said surface; a method wherein the following successive steps are carried out:

a) a solid support is provided;

b) the chemical attachment (binding) of the organic graft to the surface of the solid support is achieved;

c) the solid support to the surface of which is attached (bound) the organic graft is put into contact with a solution containing the $M^{n+}$ ion, and then the thereby obtained grafted solid support is washed once or several times and optionally dried;

d) the grafted solid support obtained at the end of step c) is put into contact with a solution containing a complex or salt of $[M'(CN)_m]^{z-}$, for example a salt of formula $[Alk_z]$

[M'(CN)$_m$], and a salt of an alkaline metal Alk, and then the thereby obtained solid support is washed once or several times and optionally dried;

e) steps c) to d) are optionally repeated.

f) If the steps c) and d) are the ultimate steps of the method, then during step c) the obtained grafted solid support is washed once or several times and dried, and during step d) the thereby obtained solid support is washed once or several times and dried.

In the formula given above, Alk$^+$ therefore represents a monovalent cation of an alkali metal such as Li, Na, or K, K being preferred.

The formula given above may be written in a simplified way: [Alk$_x$]M[M'(CN)$_m$] wherein M is in the degree of oxidation 2 or 3 and Alk is in the degree of oxidation 1.

Said nanoparticles may also be optionally called "nanocrystals".

By "chemically attached (bound)", is generally meant that the graft is bound, attached through a covalent bond to at least one surface of the support, i.e. to the external surface of the support and optionally inside the pores of the support if the latter is porous.

Indeed, in the case of a porous support, the graft may be attached (bound) inside the pores.

By "attached (bound) inside the pores", is then generally meant "attached (bound) to the internal surface of the walls of the channels defining said pores".

The method according to the invention is fundamentally distinguished from the methods of the prior art such as those described in the documents mentioned above in that, during step d), the grafted solid support obtained at the end of step c) is put into contact with a solution containing a complex or salt of [M'(CN)$_m$]$^{z-}$ (z=3 or 4) for example a salt of formula [Alk$_z$][M'(CN)$_m$], and further a salt of an alkali metal Alk, and not a solution exclusively containing a salt or complex of [M'(CN)$_m$]$^{z-}$, for example a salt of formula [Alk$_z$][M'(CN)$_m$]. Of course, the salt of an alkali metal Alk further added, is different, distinct, from the complex or salt of [M'(CN)$_m$]$^{z-}$, for example from the salt of formula [Alk$_z$][M'(CN)$_m$].

It should be noted that the nature of the salt or complex of [M'(CN)$_m$]$^{z-}$ and the amount of alkali metal which is provided during the dissolution of the salt of [M'(CN)$_m$]$^{z-}$ (cyanate salt) in solution do not matter. Indeed, according to the invention it is the fact of adding a salt of an alkali metal in addition to the complex or salt of cyanate—whether the latter is a complex or salt of an alkali metal or not—which ensures that the desired structure according to the invention is obtained as described above.

The addition of a salt of an alkaline metal during this step d), is neither described nor suggested in the prior art.

By the addition of a salt of an alkaline metal during this step of the method according to the invention, it is possible to obtain reliably, certainly, and reproducibly the stoichiometric compound as defined earlier: [Alk$^+_x$]M$^{n+}$[M'(CN)$_m$]$^{z-}$, whereas—and this is unanimously confirmed by the literature—a non-stoichiometric compound, for example of formula Alk$_x$M$_{1-x}$[M$^{II}$M'$^{III}$(CN)$_6$]; Alk$_x$M$_{1-x}$[M$^{III}$M'$^{II}$(CN)$_6$]; Alk$_{2x}$M$_{1-x}$[M$^{II}$M'$^{II}$(CN)$_6$]; Alk$_x$M$_{1-x}$[M$^{II}$M''$^V$(CN)$_8$] with x strictly less than 1 is obtained when this synthesis is carried out without any further addition of an alkali metal salt such as a potassium salt.

The method according to the invention does not have the drawbacks, defects, limitations and disadvantages of the methods of the prior art, and it provides a solution to the problems of the methods of the prior art such as those described in the documents mentioned above.

The method according to the invention is globally, as a whole, simple, resorts to known and proven processes, is reliable and perfectly reproducible. Indeed, it allows the preparation of a final product for which the characteristics, the composition—notably as regards the stoichiometry of alkali metal—, and the properties, are perfectly determined and do not undergo random variations.

The method according to the invention has a slight impact on the environment, in particular since it does not generally apply organic solvents but only water and it does not resort to controlled atmospheres.

The material produced by the method according to the invention containing an alkaline metal in its structure has better extraction capacities, for example of Cs. Further, in the material prepared by the method according to the invention, the ion exchange during extraction, for example of cesium, is exclusively produced with the potassium, and there is no salting-out of the metal M or M' which enters the structure of the hexacyanoferrate. Especially, from the point of view of observance of the discharge standards, it is much more advantageous to salt-out (release) an alkali metal such as potassium, rather than a transition metal.

Advantageously, M$^{n+}$ may be Fe$^{2+}$, Ni$^{2+}$, Fe$^{3+}$, Co$^{2+}$, Cu$^{2+}$, or Zn$^{2+}$.

Advantageously, M' may be Fe$^{2+}$ or Fe$^{3+}$ or Co$^{3+}$, and m is 6;

Advantageously, M' may be Mo$^{5+}$, and m is 8.

Advantageously, [M'(CN)$_m$]$^{z-}$ may be [Fe(CN)$_6$]$^{3-}$, [Fe(CN)$_6$]$^{4-}$, [Co(CN)$_6$]$^{3-}$, or [Mo(CN)$_6$]$^{3-}$.

Advantageously, the cations M$^{n+}$ may be Ni$^{2+}$, Cu$^{2+}$, Fe$^{2+}$ or Fe$^{3+}$ cations and the anions may be [Fe(CN)$_6$]$^{3-}$ or [Fe(CN)$_6$]$^{4-}$ anions.

Advantageously, the cations may be Fe$^{3+}$ cations and the anions may be [Mo(CN)$_6$]$^{3-}$ anions.

Advantageously, the cations may be Co$^{2+}$ or Ni$^{2+}$ cations and the anions may be [Co(CN)$_6$]$^{3-}$ anions.

Preferably, the nanoparticles fit the formula K[Cu$^{II}$Fe$^{III}$(CN)$_6$] or K$_2$[Cu$^{II}$Fe$^{II}$(CN)$_6$].

Advantageously, the nanoparticles may have the shape of a sphere or a spheroid.

The nanoparticles generally have a size, such as a diameter, from 3 nm to 30 nm.

It should be noted that the coordination polymer nanoparticles generally have a uniform size and shape throughout the support.

The organic group R2 which may be described as a functional group for anchoring nanoparticles is a group able to form an organometallic or coordination bond with the cation M$^{n+}$.

This organic group R2 may be selected from nitrogen-containing groups, such as pyridinyl groups, amine groups, diamine bidentate groups such as alkylene (for example 1 to 10C) diamine groups, for example the ethylene diamine group —NH—(CH$_2$)$_2$—NH$_2$, and amide groups; oxygen-containing (oxygenated) groups, such as acetylacetonate groups, carboxylate groups, and carboxyl groups; phosphorus-containing groups such as phosphonate groups, phosphate groups; and macrocyclic groups.

The organic group R1 may be described as a group ensuring the chemical attachment of the graft, generally by covalence to the surface of the support. This group is selected depending on the support used.

This organic group R1 may be selected from among silane groups, for example trialkoxysilane groups of formula —Si—(OR3)$_3$, wherein R3 is an alkyl group having 1 to 6C, such as the trimethoxysilane group and triethoxysilane group; carboxyl groups; carboxylate groups; phosphonate groups, such as dialkyl (1 to 6C) phosphonate groups for example diethylphosphonate; phosphonic acid groups; alkenyl groups such as ethylenic groups; alkynyl groups such as acetylenic groups; conjugate diene groups.

In the case of a membrane or a support, the surface of which consists essentially of silica, this group ensuring the covalent attachment of the graft is for example an SiO group bound to the silanol groups of the surface of the support.

In the case of a membrane or a support, the surface of which consists essentially of oxides of the $TiO_2$ or $ZrO_2$ type, this group ensuring the covalent attachment of the graft is for example a phosphonate group bound to the hydroxyl groups of the surface of the support.

The graft generally comprises a linking group L which links, connects the groups R1 and R2.

Advantageously, the organic graft therefore fits the formula R1-L-R2 wherein L is a linking group, such as an alkylene group —$(CH_2)_p$— wherein p is an integer from 1 to 12, preferably from 2 to 6.

Preferred organic grafts are $_2$(EtO)—(P=O)—$(CH_2)_2$—NH—$(CH_2)_2$—$NH_2$, or 2-aminoethyl-3-aminopropyl-trimethoxysilane.

Advantageously, the support comprises, preferably consists of, a material selected from metal oxides, such as transition metal oxides, like titanium oxides, zirconium oxides for example zirconia, niobium oxides, vanadium oxides, chromium oxides, cobalt oxides and molybdenum oxides, aluminium oxides, for example alumina, gallium oxides, and mixtures thereof; metalloid oxides such as silicon oxides, for example silica, germanium oxides, antimony oxides, and arsenic oxides, and mixtures thereof; mixed metal and/or metalloid oxides; metal aluminosilicates; metal silicates such as zirconium silicates, tin silicates, cerium silicates, compounds of the mullite type (aluminium silicate) and of the cordierite type (magnesium iron aluminium silicate), and mixtures thereof; metal titanates such as tialite, metalloid titanates, and mixtures thereof; metal carbides; metalloid carbides such as SiC, and mixtures thereof; mixtures of metal oxides and/or metalloid oxides; glasses like borosilicate glasses; carbons such as graphites, fullerenes, and mesoporous carbons; and composite materials comprising two materials or more from among the aforementioned materials.

The support may appear in a shape selected from among particles such as granules, beads, fibers, tubes like carbon nanotubes, and plates; membranes; felts; and monoliths.

Advantageously, the support appears as a powder consisting of particles such as beads and has a grain size from 0.5 mm to 1 mm.

Advantageously, the support has a BET specific surface area from 50 to 500 $m^2/g$, preferably from 100 to 200 $m^2/g$.

Indeed, a support with a large specific surface area gives the possibility of optimizing the attachment points of the graft to the support and the insertion of the nanoparticles within the support.

Advantageously, the chemical attached (binding) of the organic graft to the surface of the solid support is achieved by putting the solid support in contact with a solution of the organic graft, in a solvent selected from water, alcohols, and mixtures thereof.

Preferably, said solution is an aqueous solution, i.e. for which the solvent exclusively consists of water.

Advantageously, the solution containing the ion $M^{n+}$ is a solution, in a solvent selected from water, alcohols and mixtures thereof, of one or several salts containing the ion $M^{n+}$.

Preferably, said solution is an aqueous solution, i.e. for which the solvent exclusively consists of water.

Advantageously the solution containing a complex or salt of $(M'(CN)_m)^{z-}$ for example a salt of formula [$Alk_z$][M'$(CN)_m$], and a salt of an alkaline metal Alk, is a solution in a solvent selected from water, alcohols and mixtures thereof.

Preferably, said solution is an aqueous solution, i.e. for which the solvent exclusively consists of water.

Preferably, the washings are achieved with water, notably ultra-pure water.

Advantageously, steps c) and d) are carried out in a static mode or batch mode or else in a dynamic mode, for example in a same column.

Advantageously, the steps c) to d) may be repeated from 1 to 10 times, preferably from 1 to 4 times.

By varying the number of times, when the succession of steps c) and d) is repeated, it is possible to easily modulate the adsorption capacity of the material produced by the method according to the invention.

The method according to the invention will now be described in more detail in the following and, in connection notably with particular embodiments of the latter which are the object of examples.

An impregnation cycle refers to the succession of steps c) and d) of the method according to the invention.

A first material was prepared with the method according to the invention by carrying out the impregnation cycle in a discontinuous, "batch" mode (for each number of cycles, right bar, in black).

A second material was prepared with the method according to the invention by carrying out the impregnation cycle in a continuous mode, in a « column » (for each cycle number, left bar, in white).

Figure 2:
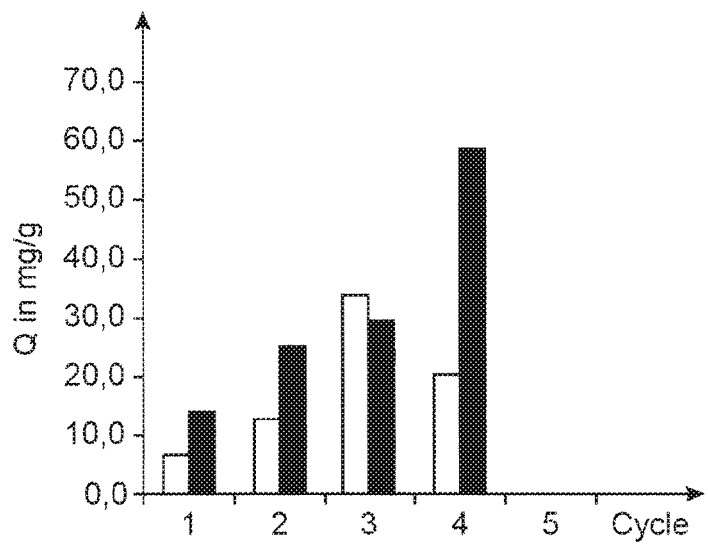

FIG. 2 is a graph which gives the adsorption capacity Q (in mg/g) of the two materials prepared in Example 2 by the method according to the invention versus the number of impregnation cycles (1 to 4 cycles).

An impregnation cycle refers to the succession of steps c) and d) of the method according to the invention.

A first material was prepared with the method according to the invention by performing the impregnation cycle in a discontinuous, "batch" mode (for each cycle number, right bar in black).

A second material was prepared with the method according to the invention by performing the impregnation cycle in a continuous mode, in a "column" mode (for each cycle number, left bar in white).

Figure 3:
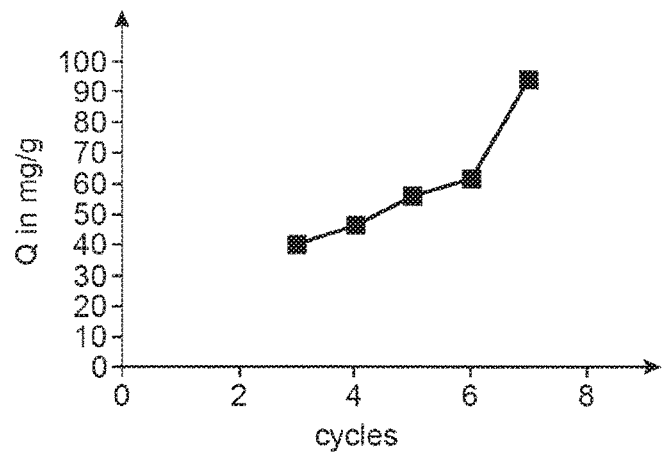

FIG. 3 is a graph which gives the adsorption capacity Q (in mg/g) versus the number of impregnation cycles of the material prepared in example 2 with the method according to the invention by carrying out the impregnation cycle in a discontinuous mode, in a "batch" mode, the synthesis being continued up to 7 cycles.

Figure 4:
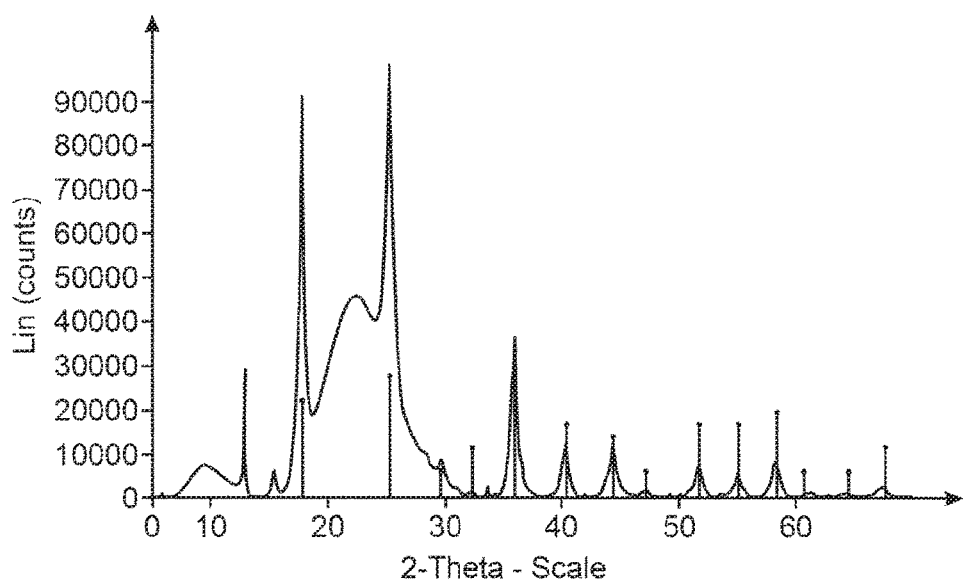

FIG. 4 is an x-ray diffraction (XRD) pattern of the material of example 2, prepared with the method according to the invention by carrying out 5 impregnation cycles in a discontinuous, "batch" mode.

Lin (counts) is plotted in ordinates and 2-Theta is plotted in abscissas.

Figure 5:
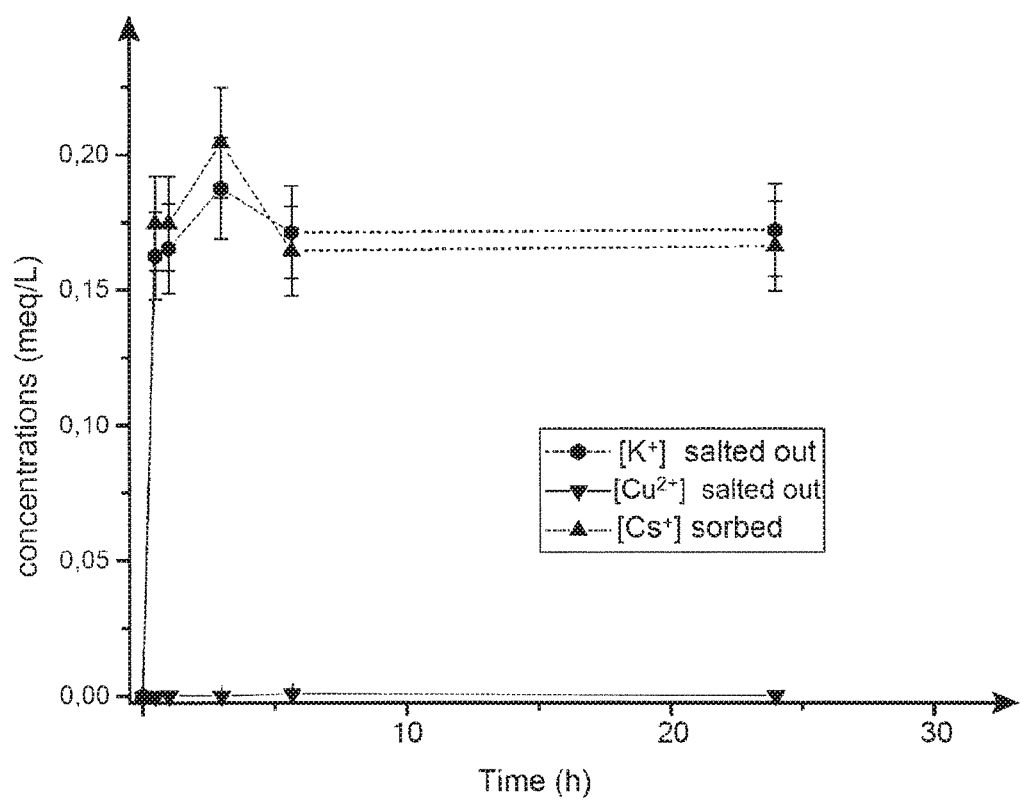

FIG. 5 is a graph which shows the extraction kinetics of cesium from the material of example 2, prepared with the method according to the invention by carrying out 5 impregnation cycles in a discontinuous, "batch" mode.

The time (in h) is plotted in abscissas.

The concentrations (in meq/L) are plotted in ordinates.

The points ● represent the salted out $K^+$ ($[K^+]$) concentration.

The points ▼ represent the salted out $Cu^{2+}$ ($[Cu^{2+}]$) concentration.

The points ▲ represent the sorbed $Cs^+$ ($[Cs^+]$) concentration.

DETAILED DISCUSSION OF PARTICULAR EMBODIMENTS

The first step of the method according to the invention consists of providing a solid support.

There are no particular limitations on the nature of the material(s) which constitute this solid support.

Generally, this support is made of one or more inorganic, mineral materials.

Preferred materials have been mentioned above.

Also no limitation exists on the structure of the support and of the material constituting it up.

Thus, the support may be porous or non porous.

First of all let us specify that the term of "porous" as used in the present invention in connection with the support, means that this support contains pores or voids, empty spaces.

Accordingly, the density of this porous support is less than the theoretical density of the same non-porous support which is described as a bulk, solid, material.

The pores may be connected or isolated but in the porous support according to the invention, the majority of the pores are connected, in communication. This is then referred to as open porosity or interconnected pores but the method according to the invention may also be applied with a porous support for which the pores are not interconnected.

Generally, in the support according to the invention, the pores are percolating pores which connect a first surface of said support to a second main surface of said support.

In the sense of the invention, a support is generally considered as porous when its density is at most of about 95% of its theoretical density.

The porosity of the support may vary within wide limits, it may generally be from 25 to 50%.

The porosity is generally measured by nitrogen adsorption-desorption analysis or by mercury porosimetry.

The support used in the method according to the invention may only have a single type of porosity, for example a microporosity, a mesoporosity or a macroporosity.

Or else, the support used in the method according to the invention may simultaneously have several types of porosities for example selected from among a microporosity (size of the pores, for example diameter, generally less than 2 nm), a mesoporosity (size of the pores, for example diameter, from 2 to 20 nm), and a macroporosity (size of the pores, for example diameter greater than 20 nm, for example up to 100 nm).

The porosity may be ordered, organized, structured, for example mesostructured, or not.

Also there is no limitation as to the size of the support, and the size of the support may vary between wide limits.

The support may thus be a support of a nanoscopic size, i.e. of a size (defined by the largest dimension) from 50 nm to 100 nm, a microscopic support, i.e. of a size from 100 nm to 1 mm, or a macroscopic support, i.e. with a size greater than 1 mm.

The support may assume all sorts of shapes already described above.

The support may thus appear as particles such as spheres (beads) or spheroids, fibers, tubes notably in the case of carbon nanotubes, or plates.

However, in order to allow the use of the support in a continuous extraction method notably applied in a column, it is generally preferred that the support appear as particles forming a powder. And it is further preferred that this powder has a grain size (particle size) which reduces the potential pressure drops. An ideal grain size is from 0.5 mm to 1 mm.

The size of the particles is defined by their largest dimension which is their diameter in the case of spheres or spheroids.

Another preferred shape for the support and which also allows reduction in the pressure drops is the shape of monoliths, generally with a size of at least 5 mm containing macropores.

Advantageously, the support has a BET specific surface area from 50 to 500 $m^2/g$, preferably from 100 to 200 $m^2/g$ measured by nitrogen adsorption-desorption or by mercury porosimetry.

Generally, the support is washed, for example with ultrapure water, one or several times, and then dried for example in an oven at a temperature of 120° C. for 24 hours before carrying out the other steps of the method.

The steps which will now be described for the chemical attachment (biding) of the organic graft and the preparation of nanoparticles of a coordination polymer with CN ligands bound to these grafts on at least one surface of the solid support, are substantially similar to those of the method described in the document of Folch et al. [3], in document WO-A2-2010/133689 [1], and in document WO-A1-2014/049048 [2], however with the difference that in these documents, the porous support used is limited to specific porous supports made of mesoporous silica or of porous glass, or to supports specifically appearing as a membrane, and also with the difference that, according to the invention, during step d), the grafted solid support obtained at the end of step c) is put into contact with a solution containing a complex or salt of $(M'(CN)_m)^{z-}$, for example a salt of formula $[Alk_z][M'(CN)_m]$, and further a salt of an alkaline metal Alk, and not with a solution exclusively containing a complex or salt of $(M'(CN)_m)^{z-}$, for example a salt of formula $[Alk_z][M'(CN)_m]$.

It is therefore possible to refer to these documents notably as regards the reagents and the operating conditions applied in these steps but also for the description of the nanoparticles and of their attachment to the surface of the support via the graft.

During a first step, the chemical attachment (binding) of the organic graft, also called organic complex, to at least one surface of the solid support is achieved.

The attachment (binding) is accomplished to the external surface of the support, and if the support is porous, the attachment (binding) is also accomplished inside the pores of the support, more exactly at the surface of the internal wall of the pores.

This step may also be called a functionalization step.

In other words, during this first step, grafting of the organic graft to at least one surface of the support is achieved, i.e. to at least one external surface of the solid support and optionally inside the pores of the support if the latter is porous.

The organic graft comprises an organic group R2, which may be called a functional group for anchoring the nanoparticles.

A functional group for anchoring the nanoparticles is a group capable of forming an organometallic or coordination bond with the $M^{n+}$ cation, in other words a group capable of complexing the $M^{n+}$ cation.

Examples of such organic groups have already been mentioned above.

Mention may notably be made of nitrogen-containing organic groups, oxygen-containing organic groups, and phosphorous-containing organic groups.

A preferred organic group is the diaminoethylene bidentate group (Example 1).

The organic group, functional anchoring group, may be directly bound to at least one surface of the solid support but it is generally chemically bound, attached, generally through a covalent bond to at least one surface of the solid support, by reaction of an attachment group R1 of said graft with said surface, more exactly with groups present on said surface.

The graft thus comprises an organic group, also called a functional anchoring group R2, and a group R1 ensuring the covalent attachment of the graft to at least one surface of the solid support.

Generally, the functional anchoring group R2 and the attachment group R1 of the organic graft are connected via a linking arm, group L, such as a linear alkylene group with 1 to 10 carbon atoms, preferably from 2 to 6 carbon atoms like a group $-(CH_2)_2-$.

The group ensuring the covalent attachment of the graft may be selected from among the groups already mentioned above, such as silane groups such as trialkoxysilane groups, for example triethoxysilane or trimethoxysilane groups and the phosphonate groups such as dialkylphosphonate groups, for example the diethylphosphonate group.

The silane and phosphonate groups allow the covalent attachment of the graft by reacting with the hydroxyl groups which are generally found at the surface of the support. The bond between the surface of the support on the one hand, and the graft on the other hand is then a bond $-O-Si$ or a bond $-O-P$.

In the case of a solid support for which the surface consists essentially with silica, the group ensuring the covalent attachment of the graft reacts with the silanol groups of the surface of the support.

In the case of a support for which the surface essentially consists of titanium and/or zirconium oxides, the binding will preferentially be accomplished by means of a phosphonate group thereby allowing the use of aqueous solutions during the grafting step.

In order to obtain the attachment of the graft to the surface of the solid support, this solid support is therefore put into contact with a compound (by simplification, graft refers both to this compound before attachment and to this compound once it is attached, bound) comprising said functional anchoring group, an attachment group capable of binding chemically, notably by covalence, to the surface of the solid support, by reaction with the surface of the solid support, and optionally, a linking group L connecting, linking said functional anchoring group to the attachment group.

As this has already been seen, this attachment group may be for example selected from among trialkoxysilane groups or dialkylphosphonate groups, which react with the hydroxyl groups which may be present at the surface of the solid support.

Generally, the putting into contact is achieved by putting the solid support in contact with a solution of said compound, graft, comprising a functional anchoring group R2, an attachment group R1, and optionally a linking group L in a solvent.

Thus, it is possible to put the membrane and the membrane support in contact with a solution of 2-aminoethyl-3-aminopropyl-trimethoxy-silane, of amine phosphonate bidentate, or with a solution of $(CH_3O)_3Si(CH_2)_2C_5H_4N$, in a solvent.

A preferred solvent in the case of the amine phosphonate bidentate is distilled or ultra-pure water, a preferred solvent in the case of $(CH_3O)_3Si(CH_2)_2C_5H_4N$ is toluene, and a preferred solvent in the case of 2-aminoethyl-3-aminopropyl-trimethoxy-silane is ethanol.

The putting into contact may be achieved in a dynamic mode, i.e. the solid support is put into contact with a stream of the solution of the compound, which circulates in a closed circuit.

Or else, the putting into contact may be achieved in a "static mode". For example, the solid support is placed in a container containing the solution and the solvent is heated, and is optionally refluxed.

The duration of the putting into contact is generally from 4 to 96 hours, for example of 96 hours in "a dynamic mode", and from 12 to 48 hours, for example 24 hours in a "static mode".

The functionalized, grafted solid support is then separated from the solvent for example by filtration.

At the end of the contacting, it is generally proceeded with rinsing of the grafted solid support, for example with distilled or ultra-pure water, and then optionally with acetone, for example for a period of 1 hour, this period is the same in a dynamic mode or in a static mode.

The grafted solid support is then optionally dried, for example at room temperature for a period from 10 h to 4 days, for example a period of 3 days.

At the end of this first step, a solid support functionalized with organic groups such as ethylene diamine groups is therefore obtained.

It is then preceded in a second step with the growth at the surface of the solid support of a metal coordination polymer with CN ligands.

This growth is achieved in two successive, optionally repeated steps.

These are the steps c) and d) of the method according to the invention, the succession of which constitutes what may be called an impregnation cycle, said cycle being optionally repeated.

One begins by putting the solid support at the surface of which is attached the organic graft, in contact with a solution containing the ion $M^{n+}$, generally as a metal salt.

Advantageously, the solvent of this solution may be water. The preferred solvent is ultra-pure water.

The metal salt contained in this solution is a salt for which the metal is generally selected from among metals which may give a cyanometallate of this metal, such as a hexacyanoferrate of this metal, which is insoluble.

This metal may be selected from among all the transition metals, for example from among copper, cobalt, zinc, nickel and iron etc. The ion $M^{n+}$ may therefore be selected from among the $Fe^{2+}$, $Ni^{2+}$, $Fe^{3+}$, $Co^{2+}$, $Cu^{2+}$, and $Zn^{2+}$ ions.

The metal salt may for example be a nitrate, a sulfate, a chloride, an acetate, a tetrafluoroborate, optionally hydrated, of one of these metals M.

For example, this may be copper nitrate.

The concentration of the metal salt in the solution is preferably from 0.01 to 1 mol/L, still preferably from 0.01 to 0.05 mol/L.

The amount of salt used is moreover preferably from about 0.1 to 1 mmol/g of treated solid support.

Advantageously, the solvent of the solution containing the ion $M^{n+}$ may be water.

The putting into contact which may also be described as an impregnation of the solid support is generally carried out at room temperature, and its duration is generally from 4 to 96 hours.

This putting into contact may be achieved in a static mode also called a "batch" mode, preferably with stirring, in which case its period is generally from 12 to 96 hours, or else in a dynamic mode also called a "column" mode, in which case its duration is generally from 4 to 24 hours.

At the end of this contacting, a solid support is obtained in which cations $M^{n+}$ are bound through an organometallic or coordination bond to the functional anchoring group of the graft.

Thus, in the case of ethylenediamine, a bond is established between one of the nitrogen atoms and the cation $M^{n+}$, and in the case of pyridine, a bond is established between the nitrogen of the cycle and the cation $M^{n+}$.

At the end of the contacting, it is proceeded with washing of the solid support.

In a static mode, the solid support is generally removed from the solution and one proceeds with washing.

In the dynamic mode, the solid support is not removed from the solution, but the washing is directly carried out.

The washing consists of washing once or several times, for example 1 to 3 times the solid support, preferably with the same solvent as the solvent of the $M^{n+}$ solution, such as water.

This washing operation gives the possibility of removing the excess metal salt and of obtaining a stable product with a perfectly defined composition.

It is then possible to optionally proceed with drying which is possible but not necessary.

The solid support which has reacted with the metal cation $M^{n+}$ as described above is then put into contact with a solution of a complex (which may also be called a salt) of $(M'(CN)_m)^{z-}$, for example a solution of $(Cat)_z[M'(CN)_m]$, preferably a solution of a salt of formula $Alk_z[M'(CN)_m]$, still preferably a solution of a salt of formula $K_z[M'(CN)_m]$; and further of a salt of an alkali metal Alk.

The alkali metal may be selected from among Li, Na, and K.

Preferably, Alk is K.

The salt of an alkali metal is different, distinct from the salt or complex of $(M'(CN)_m)^{z-}$ also contained in the solution.

The salt of an alkali metal may be selected for example from nitrates, sulfates, and halides (chlorides, iodides, fluorides) of an alkali metal Alk, such as potassium nitrate.

Advantageously, the solvent of this solution may be water. The preferred solvent is ultra-pure water.

The contacting which may also be described as an impregnation of the solid support is generally carried out at room temperature, and its duration is generally from 2 to 96 hours.

This contacting may be achieved in a static mode or "batch" mode, preferably with stirring, in which case its duration is generally from 12 to 96 hours, or else in a dynamic mode, in which case its duration is generally from 2 to 24 hours.

The complex generally fits the following formula:

$(Cat)_z[M'(CN)_m]$, wherein M', m, and z have the meaning already given above, and Cat is a monovalent cation generally selected from among cations of alkali metals Alk such as K or Na, the ammonium cation, quaternary ammoniums such as tetrabutylammonium ("TBA"), and the phosphonium cations such as tetraphenylphosphonium ("$PPh_4$"). Preferred complexes are the complexes of formula $Alk_z[M'(CN)_m]$, still preferably $K_z[M'(CN)_m]$, for example $K_4Fe(CN)_6$.

Other complexes which may be used are complexes of formula $[N(C_4H_9)_4]_x[M'(CN)_m]$, like the complexes of formula $[N(C_4H_9)_4]_3[M'(CN)_m]$ such as $[N(C_4H_9)_4]_3[Fe(CN)_6]$, $[N(C_4H_9)_4]_3[Mo(CN)_6]$, and $[N(C_4H_9)_4]_3[Co(CN)_6]$.

The concentration of the complex in the solution is generally from 0.001 to 1 mol/L, preferably from 0.001 to 0.05 mol/L.

The concentration of the salt of an alkaline metal in the solution is generally from 0.001 to 1 mol/L, preferably from 0.001 to 0.05 mol/L.

Advantageously, the concentration of the complex and the concentration of the salt of an alkaline metal are the same.

On the other hand, the solution of salt or of complex of $[M'(CN)_m]^{z-}$ applied is generally prepared so that the mass ratio of the salt or complex to the amount of the impregnation support consisting of the initial solid support is preferably from 0.1 to 5 mmol/g of solid support.

Thus the attachment of the anionic portion $[M'(CN)_m]^{z-}$, for example $[Fe(CN)_6]^{4-}$, of the complex on the cations $M^{n+}$ and simultaneously the insertion of the alkali metal into the structure of the crystal are thereby obtained. This attachment is accomplished by the formation of bonds of the covalent type which are relatively strong depending on the medium, and this attachment is generally quantitative, i.e. all the $M^{n+}$ cations react. The attachment therefore does not have any random nature.

The insertion of an alkali metal in the whole of the sites of the structure of the crystal is possible on the one hand by means of the optional presence of an alkali metal in the complex or salt such as $Alk [M'(CN)_m]$ but especially by the additional presence of a salt of an alkali metal added to the impregnation solution.

This is why it is generally preferable that the same alkaline metal Alk be present in the complex such as $Alk_z[M'(CN)_m]$ as well as in the alkaline metal salt of the impregnation solution.

At the end of the contacting, one proceeds with washing of the solid support.

In a static mode, the solid support is generally removed from the solution and one proceeds with the washing.

In a dynamic mode, the solid support is not removed from the solution, but the washing is carried out directly.

The washing consists of washing once or several times, for example 1 to 3 times, the membrane and the membrane support, preferably with the same solvent as the solvent of the complex solution, such as ultra-pure water.

This washing operation has the purpose of removing the complexes of $[M'(CN)_m]^{z-}$ which were not attached (bound) on the cations $M^{n+}$ and gives the possibility of obtaining a solid support in which there no longer exist any free, unbound $[M'(CN)_m]^{z-}$ which may be released.

The succession of the steps for putting the solid support in contact with the metal cation $M^{n+}$ and of washing (once or several times), and then putting the solid support in contact with a solution of a salt or of a complex of $[M'(CN)_m]^{z-}$, for example of $[M'(CN)_m]^{3-}$, and of a salt of an alkali metal, and washing (one or several times), may be carried out only once, or else it may be repeated generally from 1 to 10 times, for example from 1 to 4, 5, 6 or 7 times, it is thus possible to perfectly adjust the size of the nanoparticles.

The weight content of the mineral fixer, i.e. for example of insoluble metal hexacyanoferrate and of an alkaline metal of formula $[Alk^+_x]M^{n+}[M'(CN)_m]^{z-}$ is generally from 1 to 10%, for example 3%, based on the mass of the solid support.

The nanocomposite solid material prepared by the method according to the invention, may notably be applied, but not exclusively, in a method for fixing (binding) at least one mineral pollutant for example of a metal cation contained in a solution, wherein said solution is put into contact with said composite solid material fixing (binding) mineral pollutants.

The materials prepared by the method according to the invention, because of their excellent properties, such as an excellent exchange capacity, excellent selectivity, high reaction rate, are particularly suitable for such a use.

This excellent efficiency is obtained with reduced amounts of mineral fixer such as an insoluble hexacyanoferrate.

Further, the excellent mechanical strength and stability properties of the material prepared by the method according to the invention, resulting from its specific structure allows its to be conditioned in a column and the continuous application of the fixing (binding) method, for example in a fluidized bed, which may thus be easily integrated into an existing facility, for example in a treatment chain or line comprising several steps.

The solutions which may be treated with the composite solid material fixing (binding) mineral pollutants, prepared by the method according to the invention are very diverse, and may even contain for example corrosive, acid, or other agents, because of the excellent chemical stability of the material according to the invention.

The material prepared by the method according to the invention may in particular be used over a very wide range of pHs. For example, aqueous nitric solutions with concentrations for example ranging from 0.1 to 3M, acid or neutral solutions up to a pH of 10 may be treated. The mineral pollutant which may be fixed (bound) by the material prepared by the method according to the invention may be any mineral pollutant, i.e. for example any pollutant stemming (based on) a metal or an isotope, preferably a radioactive isotope, of this metal, which may be found in solution.

This pollutant is preferably selected from among anionic complexes, colloids, cations and mixtures thereof.

Preferably this is a pollutant, such as a cation from an element selected from among Tl, Fe, Cs, Co, Ru, Ag, and isotopes, in particular radioactive isotopes thereof, from among which mention may be made of $^{58}Co$, $^{60}Co$, $^{55-59}Fe$, $^{134}Cs$, $^{137}Cs$, $^{103,105,105,107}Ru$. The metal cation is in particular Cesium $Cs^+$ or Thallium $Tl^{2+}$.

The anionic complex is for example $RuO_4^{2-}$.

A preferred use of the material prepared by the method according to the invention is the fixing (binding) of cesium which contributes to a large portion of the gamma activity of liquids from the nuclear industry and which is selectively fixed (bound) by hexacyanoferrates.

The concentration of the pollutant(s) such as of the cation(s) may vary between wide limits: for example, it may be for each of the latter from 0.1 picogram to 100 mg/L, preferably from 0.01 mg/L to 10 µg/L.

The solution to be treated by the material prepared by the method according to the invention is preferably an aqueous solution, which may, in addition to the pollutant(s) such as cation(s) to be fixed (bound), contain other salts in solution such as $NaNO_3$ or $LiNO_3$ or further $Al(NO_3)_3$ or any other soluble salt of an alkali or earth-alkaline metal at a concentration which may attain up to 2 moles/L. The solution may also contain, as indicated above, acids, bases, and even organic compounds.

The solution to be treated may also be a solution in a pure organic solvent such as ethanol (absolute alcohol), acetone or other, in a mixture of these organic solvents, or in a mixture of water and of one or several of these organic solvents miscible with water.

The material prepared by the method according to the invention thus has the advantage of being able to treat solutions which cannot be treated with organic resins.

This solution may consist in a process liquid or in an industrial effluent or other which may in particular stem from the nuclear industry and facilities or from any other activity related to the nuclear industry.

From among the various liquids and effluents of the nuclear industry, nuclear facilities and activities applying radionuclides which may be treated by a material prepared by the method according to the invention, for example mention may be made of cooling waters of power plants, and of all the various effluents coming into contact with radio-isotopes such as all the washing waters, the solutions for regenerating resins, etc.

It is quite obvious that the material prepared by the method according to the invention may also be applied in other non-nuclear fields of activities, industrial fields of activities or other fields of activities.

Thus, hexacyanoferrates selectively fix (bind) thallium and this property may be used for purifying effluents from cement works for reducing or suppressing this discharges and emissions of this element which is a strong poison.

It was seen that the fixing (binding) method which applies the material prepared by the method according to the invention is preferably applied continuously, the nanocomposite material prepared by the method according to the invention, preferably as particles, then being conditioned for example as a column, the material preferably forming a fluidized bed, the fluidization of which is ensured by the solution to be treated, but the fixing (binding) method may also be applied discontinuously, in a "batch" mode, the putting into contact of the exchange material and of the solution to be treated then preferably being achieved with stirring. The conditioning as a column gives the possibility of continuously treating significant amounts of solution, with a strong flow rate of the latter.

The contact time of the solution to be treated with the material prepared by the method according to the invention is variable and may range for example from 1 minute to 1 hour for a continuous operation, and, for example from 10 minutes to 25 hours, preferably from 10 minutes to 24 hours, for a "batch" operation.

At the end of the fixing (binding) method, the pollutants found in the solution, such as cations, are immobilized in the fixing (exchanging) nanocomposite solid material according to the invention by sorption, i.e. by ion exchange or adsorption within the nanoparticles, within the structure of the nanoparticles, which are themselves chemically bound to the surface of the solid support.

The invention will now be described with reference to the following examples, given as an illustration and not as a limitation.

EXAMPLES

Example 1

In this example, the method according to the invention is applied with a support which is a porous glass and an organic ligand which is a diamine.

The support for grafting an analogue of Prussian blue is a commercial porous glass (TRISPOR®), as granules with a grain size of 200-500 μm, with a pore size of 30 nm and having a specific surface area of the order of 130 m²/g.

The operating mode for inserting Copper-Potassium ferrocyanide ($K_2Cu(Fe(CN)_6)$) within this porous glass is the following:

1. Grafting of the Organic Ligand, Graft: $R1$-$(CH_2)_p$—$R2$.

The Ligand used for this step (step b) of the method according to the invention) and in this example is 2-aminoethyl-3 aminopropyl-trimethoxysilane marketed by ABCR (but many other suppliers exist).

CAS number: 1760-24-03.

Molecular formula: $(CH_3O)_3Si(CH_2)_3NH(CH_2)_2NH_2$

Molar mass: 222.36 g/mol.
Structural formula:

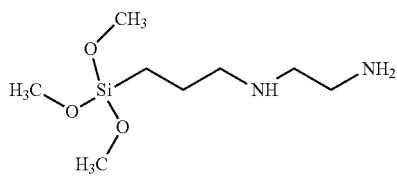

Here, R1 corresponds to trimethoxysilane, while R2 corresponds to the diamine group.

The grafting of this ligand with amine functions to the surface of the porous glass, begins with an activation step which consists of heating in a primary vacuum 10 g of powder of the support in a 250 mL flask at 130° C., for 16 to 20 h (one night).

After this activation, 250 mL of ethanol and 1 mL of the ligand are added into the flask. The whole is put into the oven at 60° C. for 16 to 20 h. And then after filtration, the grafted powder is washed with water, and then with acetone, and dried at room temperature for about 3 days.

2. Impregnation of the Ferrocyanide Particles within the Support.

This second synthesis step has the goal of growing copper ferrocyanide particles within the support.

The previous graft is bound to the support through Si—O—Si bonds.

During this second step, during a first reaction, one begins to have the aminated complex react with a copper salt in order to generate a Cu—N bond, and then during a second reaction, the product of the first reaction is reacted with a potassium ferrocyanide salt in order to grow the compound ($K_2Cu(Fe(CN)_6)$).

According to the invention, in order that the synthesis of this compound be reproducible, it is necessary to also add a potassium salt during the second reaction. Indeed, all the examples of the literature show that a non-stoichiometric compound $K_{2x}Cu^{II}_{2-x}Fe^{II}(CN)_6$ is obtained when this synthesis is carried out without adding any potassium salts.

Two impregnation solutions S1 and S2 are required for conducting the first and then the second reactions.

The first solution S1, which allows the first reaction to be conducted contains a copper salt, i.e. $CuNO_3$ at $10^{-2}$ mol/L, and the second solution S2, which allows the second reaction to be conducted, contains a mixture of a potassium ferrocyanide salt, i.e. $K_4Fe(CN)_6$ at $10^{-2}$ mol/L and of a potassium salt, i.e. $KNO_3$ at $10^{-2}$ mol/L.

An impregnation cycle corresponds to the putting into contact, in a "batch" mode or in a "column" mode of the grafted support, first of all with the solution S1, and then after washing with water, with the second solution S2.

The impregnation was achieved either in a "batch" mode, i.e. by putting into contact 3 g of grafted support with successively 1 L of the different impregnation solutions S1 and S2, or in a "column" mode, i.e. by filling a column with 3 g of grafted support and by successively having 1 L of each impregnation solution S1 and S2 pass into the column.

After each cycle, a small amount of powder is sampled in order to measure the adsorption capacity of the thereby elaborated material. For this, the reference test is accomplished from a solution at 0.1 mmol/L of Cs nitrate and 1 mmol/L of sodium nitrate. 25 mg of material is placed in 50 mL of this solution based on Cs and Na for about twenty hours. The analysis of the Cs concentration is accomplished in the initial solution and in the final solution in order to evaluate the capacity of adsorption of the final material. This adsorption capability is thus expressed as:

$$Q_s = ([Cs]_i - [Cs]_f)\frac{V}{m}$$

wherein $[Cs]_i$ and $[Cs]_f$ respectively represent the initial and final Cs concentration; V the volume of solution used and m the mass of material used.

Figure 1:
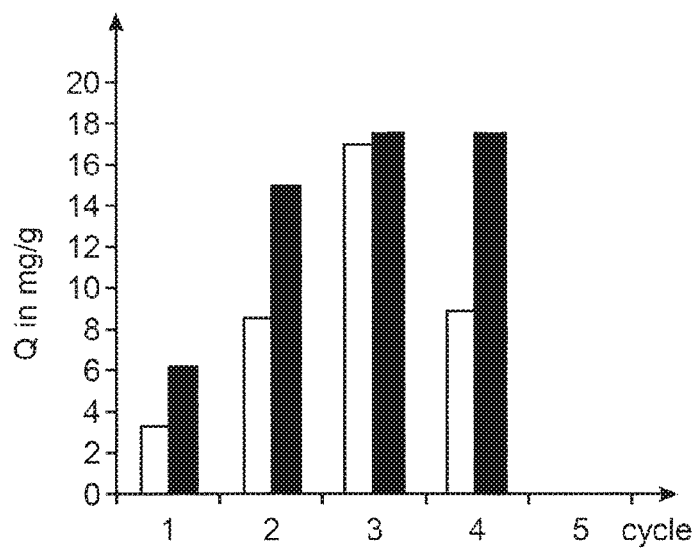
FIG. 1 is a graph which gives the capacity of adsorption Q of the cesium (in mg/g) of the two materials prepared in example 1 by the method according to the invention versus the number of impregnation cycles (1 to 4 cycles).

FIG. 1 shows the results obtained in terms of capacity of adsorbing cesium with the material prepared as described above by a method in which the impregnation was carried out in a "batch" mode, and with the material prepared as described above by a method in which the impregnation was carried out in a "column" mode.

The Cs adsorption capacity is equivalent for materials for which the impregnation was carried out in a "batch" mode and in a "column" mode, with three cycles of impregnation, with a value of about 18 mg/g.

The drop in the adsorption capacity for materials for which the impregnation was carried out in a "column" mode, at the fourth impregnation cycle, however shows an effect of clogging of the pores which is not found in materials for which the impregnation was carried out in a "column" mode.

Example 2

In this Example, the method according to the invention is applied with a support which is a commercial silica gel already provided with amine functions by grafting of a ligand.

This silica gel is available from Sigma Aldrich® and has the following properties:

Pore size=60 Å.
Particle size: 40 to 63 μm.
Specific surface area: 550 m²/g.
$[NH_2]$=1 mmol/g i.e. 9%.

Thus, only the impregnation step is required, but the cost of the synthesis is much greater because of the high cost of the support.

The impregnation cycle with copper-potassium ferrocyanide is accomplished under the same conditions as in example 1 i.e. in a "batch" mode, or in a "column" mode.

The Cs extraction tests are also accomplished under the same conditions as for Example 1.

Effect of the Impregnation Mode: "Batch" Mode or "Column" Mode.

The results obtained are compared in terms of cesium adsorption capacity with the material prepared as described above by a method in which the impregnation was carried out in a "batch" mode, and with the material prepared as described above by a method in which the impregnation was carried out in a "column" mode.

FIG. 2 shows the results obtained in terms of cesium adsorption capacity with the material prepared as described above by a method in which the impregnation was carried out in a "batch" mode, and with the material prepared as described above by a method in which the impregnation was carried out in a "column" mode.

As in Example 1, the Cs adsorption capacity is equivalent for the materials for which the impregnation was carried out in a "batch" mode and in a "column" mode, with three impregnation cycles, with a value of about 40 mg/g.

Also it appears in the same way as in Example 1, that the adsorption capacity is much higher for the materials for which the impregnation was carried out in a "batch" mode, after 4 cycles of impregnation.

Effect of the Number of Impregnation Cycles.

The synthesis was then continued up to 7 cycles of impregnation, in a "batch" mode. FIG. 3 shows the results obtained in terms of cesium adsorption capacity with the thereby prepared materials, versus the number of impregnation cycles.

A continuous variation in this adsorption capacity is observed: this shows that it is possible to easily modulate the desired capacity during the synthesis of the material by acting on the number of impregnation cycle.

After 7 cycles, this capacity is very high, of the order of 90 mg of Cs adsorbed per g of solid.

Characterization of the Material

The prepared material as described above in this Example by a method in which the impregnation was carried out in a "batch" mode with five impregnation cycles, was characterized after five impregnation cycles, with different techniques.

The X-ray diffraction pattern shown in FIG. 4 clearly shows that this is potassium-copper ferrocyanide ($K_2Cu(Fe(CN)_6)$) and silica.

Cs Adsorption Kinetics

Finally, with a view to the use of the material of this example in a column, kinetic tests were conducted on the material prepared as described above by a method in which the impregnation was carried out in a "batch" mode with 5 cycles of impregnation.

These kinetic tests consist of putting 20 mg of material in contact with 50 mL of effluent, with stirring, during different durations.

Each kinetic point corresponds to one test.

I.e. for each contact duration, a test is conducted with the putting of 20 mg in contact in 50 mL.

The initial solution consists of ultra-pure water in which 100 mg/L of Cs were dissolved in the form of $CsNO_3$. The Cs in the initial solution and the final solutions after contacting are analyzed by ion chromatography, while the potassium and the copper of these same solutions are analyzed by ICP-AES (Ionic Coupled Plasma-Adsorption Energy Spectroscopy).

The whole of the results of the kinetic tests is shown in FIG. 5.

The results of the kinetic tests clearly show that the adsorption of Cs in this material is accomplished by ion exchange between the Cs of the solution and a potassium ion of the solid.

There is no salting out of copper in the solution. The material of this Example, prepared by the method according to the invention, therefore has very interesting properties as compared with commercial adsorbents which are not prepared by the method according to the invention.

REFERENCES

[1] WO-A2-2010/133689
[2] WO-A1-2014/049048
[3] B. FOLCH et al., "*Synthesis and behavior of size-controlled cyano-bridged coordination polymer nanoparticles within hybrid mesoporous silica*", New J. Chem., 2008, 32, 273-282.

The invention claimed is:

1. A method for producing a solid nanocomposite material comprising nanoparticles of a metal coordination polymer with CN ligands, said nanoparticles satisfying the formula $[Alk^+{}_x]M^{n+}[M'(CN)_m]^{z-}$ wherein Alk is an alkali metal, x is 1 or 2, M is a transition metal, n is 2 or 3, M' is a transition metal, m is 6 or 8, z is 3 or 4; said cations $M^{n+}$ of the metal coordination polymer being bound through an organometallic or metal coordination bond to an organic group R2 of an organic graft, and said organic graft being further chemically attached to at least one surface of a solid support by reaction of a group R1 of said organic graft with said surface; said method comprising the following successive steps:

a) a solid support is provided;
   b) the chemical attachment of the organic graft to the surface of the solid support is achieved;
   c) the solid support to the surface of which is attached the organic graft is put into contact with a solution containing the $M^{n+}$ ion and then the thereby grafted solid support obtained is washed one or several times and is optionally dried;
   d) the grafted solid support obtained at the end of step c) is put into contact with a solution containing a complex or salt of $[M'(CN)_m]^{z-}$ and a salt of an alkali metal Alk, and then the thereby obtained solid support is washed once or several times, and is optionally dried; and
   e) steps c) to d) are optionally repeated, wherein
   f) if the steps c) and d) are the ultimate steps of the method, then during step c) the obtained grafted solid support is washed once or several times and is dried, and during step d), the thereby obtained solid support is washed one or several times and dried.

2. The method according to claim 1, wherein $M^{n+}$ is $Fe^{2+}$, $Ni^{2+}$, $Fe^{3+}$, $Co^{2+}$, $Cu^{2+}$, or $Zn^{2+}$.

3. The method according to claim 1, wherein M' is $Fe^{2+}$ or $Fe^{3+}$ or $Co^{3+}$, and m is 6; or M' is $Mo^{5+}$, and m is 8.

4. The method according to claim 1, wherein $[M'(CN)_m]^{z-}$ is $[Fe(CN)_6]^{3-}$, $[Fe(CN)_6]^{4-}$, $[Co(CN)_6]^{3-}$ or $[Mo(CN)_8]^{3-}$.

5. The method according to claim 1, wherein the cations $M^{n+}$ are $Ni^{2+}$, $Cu^{2+}$, $Fe^{2+}$ or $Fe^{3+}$ cations and the anions are $[Fe(CN)_6]^{3-}$ or $[Fe(CN)_6]^{4-}$ anions.

6. The method according to claim 1, wherein $M^{n+}$ is $Fe^{3+}$ and $[M'(CN)_m]^{z-}$ is $[Mo(CN)_8]^{3-}$.

7. The method according to claim 1, wherein $M^{n+}$ is $Co^{2+}$ or $Ni^{2+}$ and $[M'(CN)_m]^{z-}$ is $[Co(CN)_6]^{3-}$.

8. The method according to claim 1, wherein the nanoparticles fit the formula $K[Cu^{II}Fe^{III}(CN)_6]$ or $K_2[Cu^{II}Fe^{II}(CN)_6]$.

9. The method according to claim 1, wherein the nanoparticles have the shape of a sphere or a spheroid.

10. The method according to claim 1, wherein the nanoparticles have a diameter from 3 nm to 30 nm.

11. The method according to claim 1, wherein the organic group R2 is selected from the group consisting of nitrogen-containing groups; oxygen-containing groups; phosphorus-containing groups; and macrocyclic groups.

12. The method according to claim 1, wherein the organic group R1 is selected from the group consisting of silane groups; carboxyl groups; carboxylated groups; phosphonate groups; phosphonic acid groups; alkenyl groups; alkynyl groups; and conjugate diene groups.

13. The method according to claim 1, wherein the organic graft fits the formula R1-L-R2 wherein L is a linking group.

14. The method according to claim 13, wherein the organic graft is $(EtO)_2$—(P=O)—$(CH_2)_2$—NH—$(CH_2)_2$—$NH_2$, or 2-aminoethyl-3-aminopropyl-trimethoxysilane.

15. The method according to claim 1, wherein the support comprises a material selected from the group consisting of metal oxides and mixtures thereof; metalloid oxides and mixtures thereof; mixed metal and/or metalloid oxides; metal aluminosilicates; metal silicates and mixtures thereof; metal titanates, metalloid titanates, and mixtures thereof; metal carbides; metalloid carbides and mixtures thereof; mixtures of metal oxides and/or metalloid oxides; glasses; carbons; and composite materials comprising two materials or more from among the aforementioned materials.

16. The method according to claim 1, wherein the support is in a form selected from the group consisting of particles; membranes; felts; and monoliths.

17. The method according to claim 16, wherein the support is in the form of a powder consisting of particles and has a grain size from 0.5 mm to 1 mm.

18. The method according to claim 1, wherein the support has a BET specific surface area from 50 to 500 $m^2/g$.

19. The method according to claim 1, wherein the chemical binding of the organic graft to the surface of the solid support is achieved by putting the solid support in contact with a solution of the organic graft, in a solvent selected from the group consisting of water, alcohols, and mixtures thereof.

20. The method according to claim 1, wherein the solution containing the $M^{n+}$ ion is a solution of one or several salts containing the $M^{n+}$ ion in a solvent selected from the group consisting of water, alcohols and mixtures thereof.

21. The method according to claim 1, wherein the solution containing a complex or salt of $(M'(CN)_m)^{z-}$ and a salt of an alkali metal Alk is a solution in a solvent selected from the group consisting of water, alcohols and mixtures thereof.

22. The method according to claim 1, wherein the steps c) and d) are carried out in a static mode or batch mode, or in a dynamic mode.

23. The method according to claim 1, wherein the steps c) and d) are repeated from 1 to 10 times.

* * * * *